United States Patent [19]

Mauvieux et al.

[11] Patent Number: 4,892,701
[45] Date of Patent: Jan. 9, 1990

[54] DEVICE FOR MEASURING NUCLEAR REACTOR FUEL ASSEMBLY GRIDS

[75] Inventors: Christian Mauvieux, Lyons; Bernard Gebelin, Tassin; Philippe Herbaut, Lyons, all of France

[73] Assignees: Framatome, Courbevoie; Compagnie Generale des Matieres Nucleaires, Velizy Villacoublay, both of France

[21] Appl. No.: 123,461

[22] Filed: Nov. 20, 1987

[30] Foreign Application Priority Data

Nov. 20, 1986 [FR] France ................... 86 16135

[51] Int. Cl.$^4$ ........................................... G21C 17/06
[52] U.S. Cl. ...................................... 376/258; 73/628
[58] Field of Search ............... 376/258, 249, 252, 245; 73/620, 625, 628, 633; 33/502

[56] References Cited

U.S. PATENT DOCUMENTS

| | | | |
|---|---|---|---|
| 4,190,961 | 3/1980 | James et al. ........................... 33/502 |
| 4,274,205 | 6/1981 | Starr et al. ........................... 376/249 |
| 4,368,644 | 1/1983 | Wentzell et al. ..................... 376/249 |
| 4,605,531 | 8/1986 | Leseur et al. ........................ 376/252 |
| 4,637,912 | 1/1987 | Scharpenberg et al. ........... 376/245 |
| 4,649,650 | 3/1987 | Fink et al. ............................. 33/502 |
| 4,745,410 | 5/1988 | Schuller et al. ..................... 340/958 |
| 4,777,011 | 10/1988 | Scharpenberg ..................... 376/245 |

FOREIGN PATENT DOCUMENTS

| | | | |
|---|---|---|---|
| 0000394 | 1/1978 | Japan ................................... 376/245 |
| 0164152 | 7/1986 | Japan ................................... 376/245 |
| 2066157 | 3/1987 | Japan ................................... 73/620 |

Primary Examiner—Daniel Wasil
Attorney, Agent, or Firm—Pollock, Vande Sande & Priddy

[57] ABSTRACT

A device for measuring and remotely checking external dimensions of an external lateral face of a part of a work piece. The device comprises measuring means for measuring the length of the part and including a set of two ultrasonic transducers arranged to transmit and receive ultrasound pulses, a movable support for supporting the transducers, abutting means, first rotation means for rotating the supporting means about an axis parallel to the longitudinal axis of the workpiece, and second rotation means for rotating the supporting means between an initial position where the two transducers are substantially directed along a line perpendicular to the longitudinal axis of the workpiece and two predetermined angular positions symmetrical with respect to the initial position, and means for rectilinearly displacing the movable support for bringing the movable support into and out abutting contact with the lateral face to be measured.

6 Claims, 7 Drawing Sheets

DEVICE FOR MEASURING NUCLEAR REACTOR FUEL ASSEMBLY GRIDS

FIELD OF THE INVENTION

The present invention relates to devices and methods for measuring and remotely checking external dimensions of at least one face of one or a plurality of parts or portions of a workpiece having external lateral faces regularly disposed about a longitudinal axis and defining a substantially constant polygonal cross-section along the longitudinal axis. The invention is particularly suitable, for checking the dimensions of nuclear fuel assembly grids after their irradiation in a nuclear reactor.

Background of the Invention

In particular, the size increase of grids after irradiation in a pressurized water nuclear reactor fuel assembly can be measured with a device and a method according to the present invention. A fuel assembly for a pressurized water nuclear reactor (PWR) comprises a framework or structure generally including two end pieces connected together by elongated elements or tie rods, such as guide tubes and several grids. Those grids often called spacing grids, form cells for holding the bundle of fuel elements generally maintained at the nodal points of a square network. It is useful to measure the size increase of such grids after irradiation, for several reasons:

Grid expansion modifies the overall dimensions of the corresponding fuel assembly, which may further cause handling and storing problems of the assembly or render difficult, if needed, its reintroduction into the core of the nuclear reactor.

If the cells of a grid, which brace or hold the fuel elements in place, increase in size, it will result in a poor lateral support of the fuel elements which may be damaged.

Finally, by measuring the grids dimensions, verification of the spacing of the fuel elements in the checked assembly and calculation of the spacing between assemblies themselves when they are to be replaced in a nuclear core can be performed, and it can be determined whether such spacings have changed in a manner which may be prejudicial to a good thermal hydraulic and nuclear operation of the core, due to diminution of water thicknesses between fuel rods and/or assemblies.

Remote checking of grids of irradiated assemblies is particularly necessary for grids formed with a zirconium-based alloy, known as "Zircaloy", which is a material low in neutron absorption, but whose dimensions expand appreciably under irradiation.

Devices and methods for checking the dimensions of fuel assembly grids of a nuclear reactor are already known. A measuring member similar to a caliper using a linear, variable differential transformer is brought close to the grid to be measured. Displacement jacks, abutting stops, sensors, are then used to measure the grid dimensions with an accuracy of the order of 50 microns. This solution presents various drawbacks.

It takes a long time to perform. It requires very accurate monitoring of the operations by video camera. Risks of damage to the fuel elements of the assembly exist when bringing the measuring member close to the grid to be measured. Finally, it is not possible with the prior art device to simultaneously check several grids belonging to the same assembly, due to the important overall dimension of the prior art devices necessary for a single grid measurement.

SUMMARY OF THE INVENTION

It is an object of the invention to provide an improved device and an improved method for measuring and remotely checking some of the external dimensions of at least one surface of a plurality of parts of a workpiece of substantially polygonal constant cross-section (about an axis), such as grids of an irradiated nuclear reaction fuel assembly. It is a more particular object of the invention to provide a device for performing in a simple and reliable manner several simultaneous measurements on one or more parts to be checked, without risk of damage or degradation of said parts. In the case of its use for checking grids of fuel assemblies, the apparatus or device can be used alone or in combination with existing devices, as for example with apparatuses known in the prior art for collecting deposits of corrosion samples or impurities which accumulate on the assemblies in reactor pools.

For that purpose, the invention provides in particular, for measuring and checking dimensions of a workpiece having a longitudinal axis and at least one part along said longitudinal axis, said part having a plurality of external lateral faces regularly disposed about said longitudinal axis and defining a polygonal cross-section substantially constant along said longitudinal axis, a measuring device comprising:

measuring means for said part, for measuring the length in a plane orthogonal to the longitudinal axis of one of said external lateral faces of said part, said measuring means including a set of two ultrasonic transducers disposed at a distance from each other larger than the length of said lateral face for measuring the distance between each of said transducers and said part, said transducers being arranged to transmit and receive ultrasound pulses along a same line substantially parallel to said lateral face and in opposite directions, movable member means comprising:
(i) supporting means for supporting said two transducers,
(ii) abutting means carried by said supporting means for abutting contact with said one of said lateral faces,
(iii) first rotation means for rotating said supporting means about an axis parallel to the longitudinal axis of the work-piece
(iv) second rotation means, for rotating said supporting means between an initial position where the two transducers are substantially directed along the line perpendicular to the longitudinal axis of the workpiece and two predetermined angular positions symmetrical with respect to said initial position, about an axis perpendicular to said one of said lateral faces and to the longitudinal axis of the work-piece, and
displacement means connected to said movable means through said first rotating means, for rectilinearly displacing the movable member means for bringing said abutting means into and out of contact with said one of said lateral faces to be measured.

The invention also provides a measuring device wherein the movable member means further comprise a plurality of additional supporting means each directed to measure and check an external lateral face of said parts, each of said additional supporting means carrying a respective set of two ultrasonic transducers disposed at a distance from each other larger than the length of the corresponding lateral face to be measured, said supporting means being spaced from each other and distributed along an axis parallel to the longitudinal axis of the work piece.

In another advantageous embodiment, the supporting means for supporting said transducers comprise a supporting element carrying the transducers, a piston, rigidly connected to said supporting element and movable between a first end position and a second end position, and wherein the second rotation means comprise a finger fast to said piston, a cylinder for slidably receiving said piston, said cylinder being connected to the first rotation means and having an S-shaped slot for receiving the finger of said piston, whereby, when the piston moves within the cylinder form said first end position to said second end position, the supporting element and the transducers rotate along an axis perpendicular to the lateral face to be measured and perpendicular to the longitudinal axis of the work-piece between an initial position where the two transducers are substantially directed along a line perpendicular to the longitudinal axis of the work-piece and two predetermined angular positions symmetrical with respect to said initial position, due to cooperation between the finger and the S-shaped slot during movement of the piston along the cylinder, said measuring device further comprising actuating means for moving the piston from said first end position to said second end position along the cylinder.

The invention also provides a device wherein the abutting means consist in two abutment stops.

In another advantageous embodiment, the measuring means further comprise three ultrasonic transducers for transmitting pulses of ultrasonic waves having axis parallel to for being substantially orthogonally oriented towards the lateral face to be measured, said three ultrasonic transducers being carried by said supporting means, and wherein said supporting means have two end arms, each carrying one of the two ultrasonic transducers disposed at a distance from each other larger than the length of the lateral face to be measured, for measuring said length.

All these devices are applicable to the measurement and the checking of the grids of a nuclear reactor assembly immersed in water, but can also be used for any parts or sets of coaxial parts of the above-defined type.

The invention also provides a method for measuring and remotely checking at least one dimension of at least one external lateral face of at least one grid of a substantially vertical nuclear fuel assembly placed in a pool, said method comprising the steps of:

(a) calibrating an ultrasonic grid measuring device having at least one supporting means carrying two ultrasonic transducers for measuring the length in a substantially horizontal plane of said one of said external lateral faces, (b) rectilinearily moving said supporting means with displacement means connected therewith for bringing said supporting means into abutting contact with said one of said external lateral faces, (c) gradually pivoting said supporting means of said grid measuring device in a plane perpendicular to the cross-section of the grid and parallel to said one of said lateral faces, between an initial position in which the two transducers are substantially directed along a line perpendicular to the longitudinal axis of the grid and two predetermined angular positions symmetrical with respect to said initial position, about an axis perpendicular to said one of said lateral faces and to the longitudinal axis of the grid, while measuring continuously by ultrasounds distances between the transducers and the grid, and (d) deducing the length of said external lateral face by calculation from the measurements of said distances in reference with the calibration performed in step (a).

In an advantageous embodiment, the gradual pivoting of said supporting means is carried out by progressively imparting to said supporting means a predetermined linear force having a direction in a plane perpendicular to the lateral face to be measured.

In another advantageous embodiment, the method further comprises the steps of:

(a) calibrating the ultrasonic grid measuring device having supporting means which further comprise a plurality of transducers parallely disposed and arranged to transmit ultrasound pulses in a direction orthogonal to the lateral face to be measured, said calibrating step comprising:

bringing into abutting contact said supporting means with a jig and measuring by ultrasounds first distances between said transducers and the jig, (b) moving the supporting means out of abutting contact with said jig to bring said supporting means into abutting contact with the external lateral face to be measured, (c) measuring by ultrasounds second distances between said transducers and said external lateral face, and (d) comparing first and second distances measured and deducing the lateral face deformations therefrom.

Finally, the method according to the invention is advantageously applicable for simultaneously checking several grids of a same assembly.

BRIEF DESCRIPTION OF THE DRAWINGS

The invention will be better understood from the following description of a particular embodiment, given purely by way of example and illustrated by the attached drawings in which.

DESCRIPTION OF A PREFERRED EMBODIMENT

Figure 1:
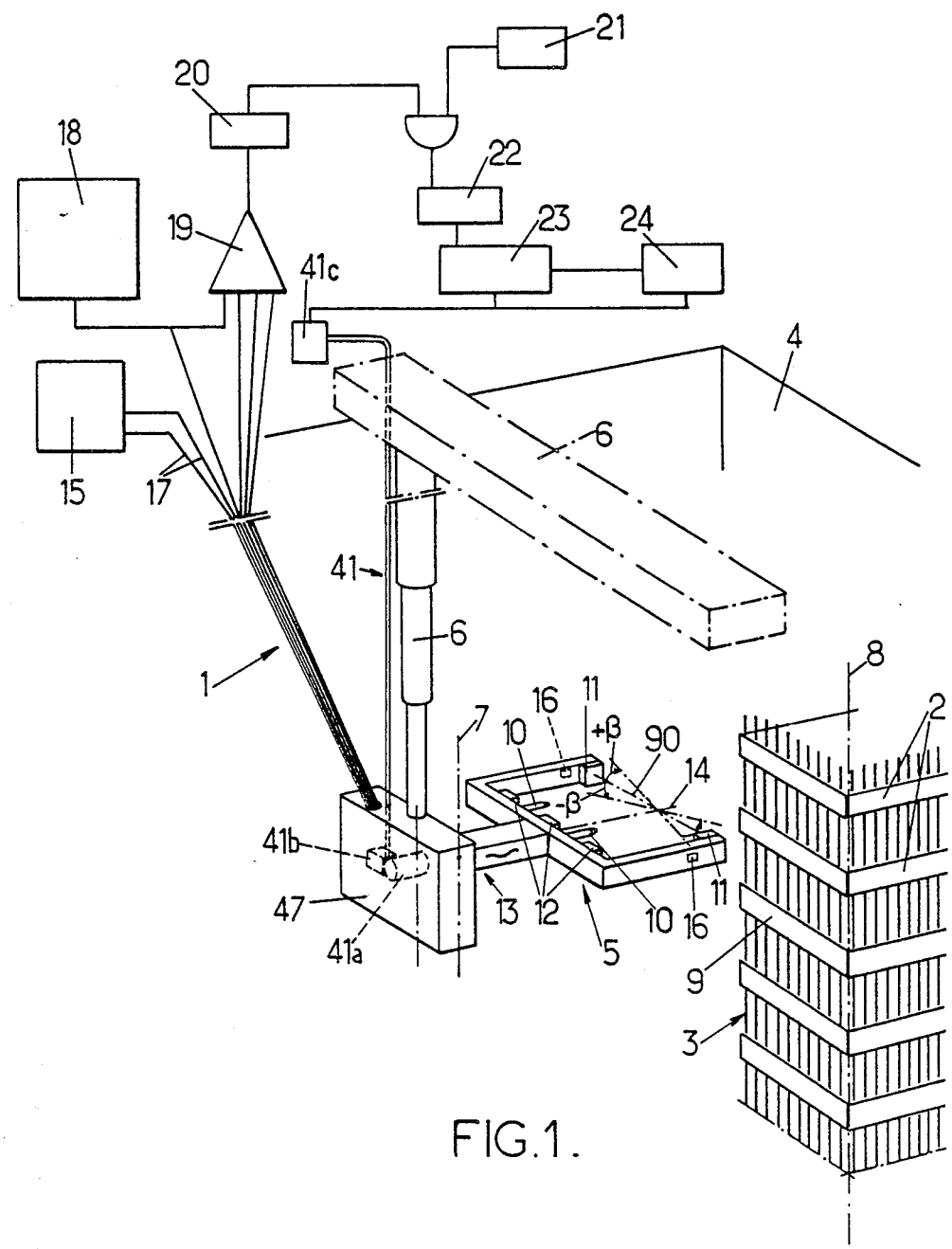
FIG. 1 is a diagrammatic view of a device according to the invention arranged for a nuclear reactor fuel assembly.

FIG. 1 shows diagrammatically a measuring and checking device 1 for remotely checking dimensions of the grids 2 of the assembly 3. Assembly 3 is in a pool 4 under water. The device comprises movable member means 5 for measuring the dimensions of the grid 2 and displacement means 6 for moving the movable member means 5. These displacement means 6 comprise means for rectilinear displacements in the x, y, z axes, such as a crane. The movable member means are rotatable through first rotation means around an axis 7 parallel with the longitudinal axis 8 of the grid 2 to be measured. When movable means are driven into abutting contact with face 9 of the grid 2, the contact is obtained through two stops or abutting means 10. Lights and TV cameras (not shown) also help the positioning against the grid of movable member means 5. Movable member means 5 comprise supporting means carrying two ultrasonic transmitter-receivers or transducers 11 separated from one another by a distance greater than the width, or length in a plane orthogonal to the longitudinal axis 8 of the grid, of the face 9 of the grid to be measured. The supporting means also carry three ultrasonic transducers 12 constituted so as to measure the distance respectively between them and the grid 2.

The movable member means 5 are in addition provided with means 13 suitable for rotating or pivoting the supporting means of member means 5 with respect to a reference position wherein the transducers 11 are substantially directed along a line 90 perpendicular to the axis 8, between two angular positions $+\beta$ and $-\beta$, about an axis 14 perpendicular to the lateral face 9 to be measured and to the axis 8 of the grid 2.

The measuring device 1 comprises in addition means 15 for measuring the temperature of the water at the level of the transducers. The measurements are performed with thermocouples 16 with cables 17. A transmitter 18 feeds the transducers 11 and 12 of the movable member means for transmitting ultrasounds toward the face 9 to be measured, as well as an amplifier 19 also receiving the signals coming from transducers 11 and 12, this time functioning as receivers after reflection of the pulses echoes on face 9. The amplifier 19 supplies a counting gate or digitizer 20, which in turn feeds a sixteen-bit counter 22 which also receives the output of a clock 21. This counter is connected to a computer 23 processing the data and itself connected to input-output peripheral units 24.

Figure 2:
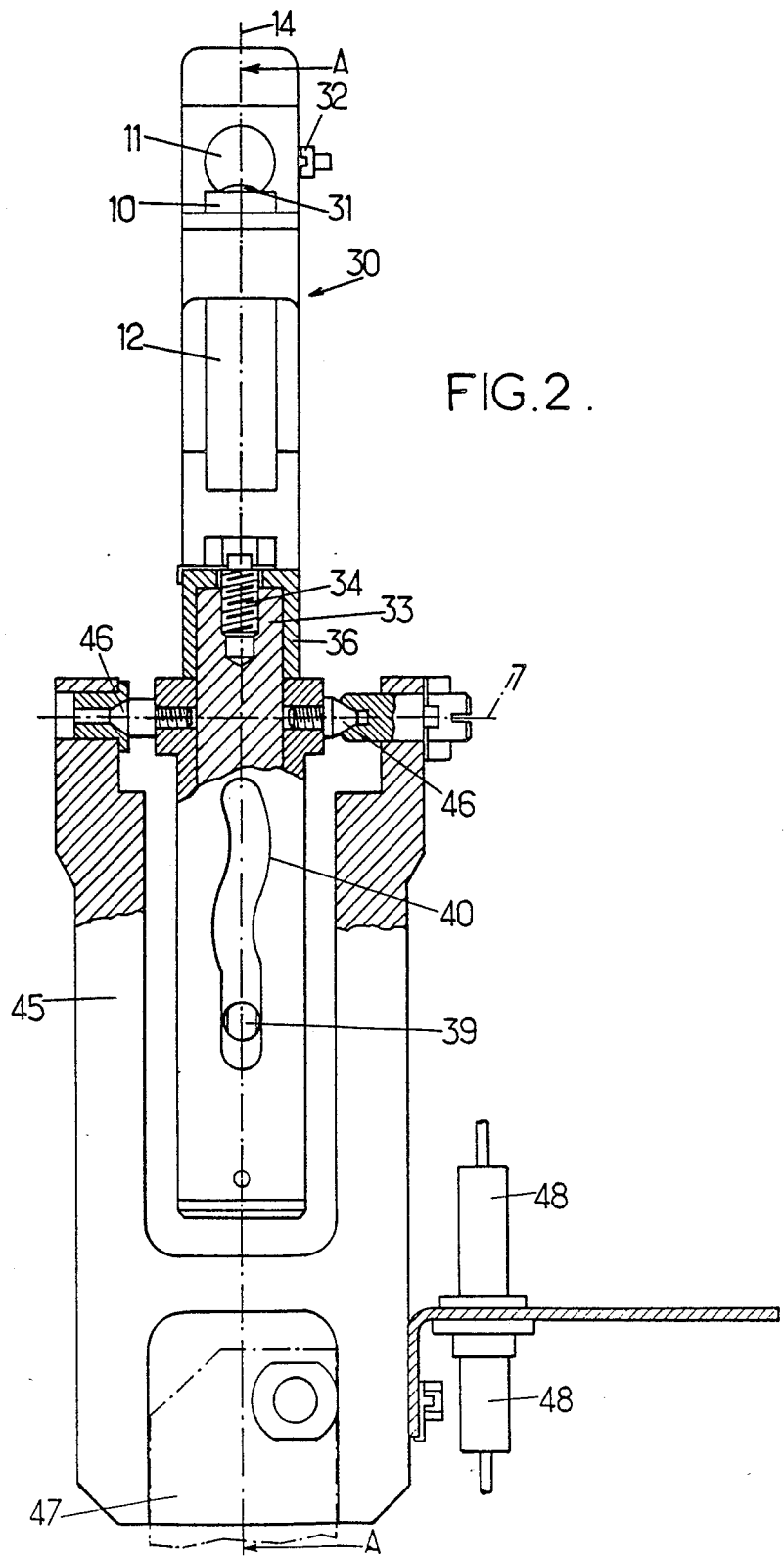
FIG. 2 is a side-view in partial cross-section of movable member means according to the invention.
Figure 3:
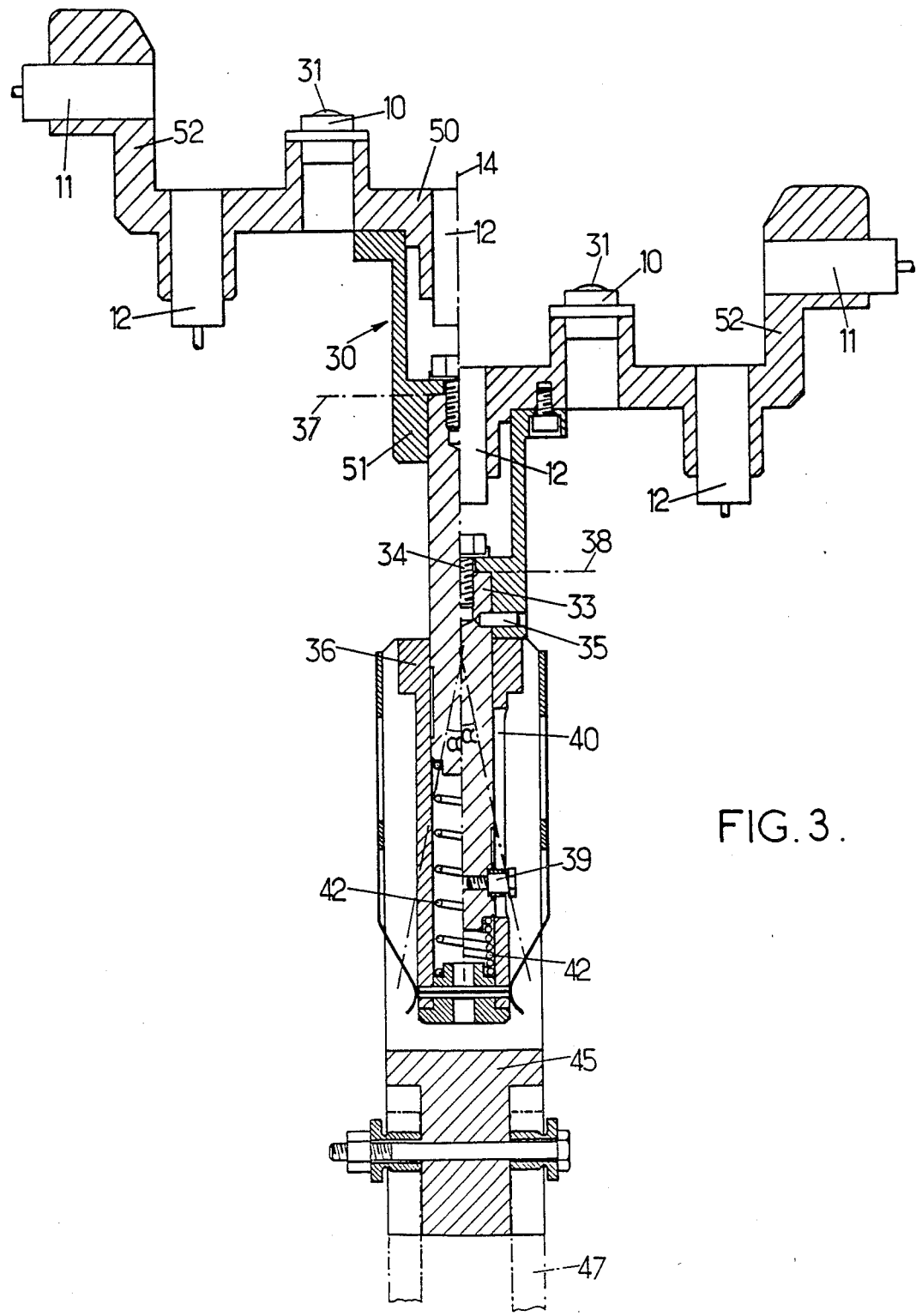
FIG. 3 is a sectional view along line A—A of FIG. 2, showing the two end positions taken by the supporting means of the movable member means.

FIGS. 2 and 3 show movable member means 5 accoording to the invention. These comprise supporting means 30 provided on the one hand with abutting stop 10 comprising balls 31 adapted to slide or roll easily over the surface of the face 9 to be measured, and on the other hand ultrasonic transducers 11 and 12. Referring to FIG. 2, the transducer 11 is fixed to supporting means 30 by attachment means 32 urged and in abutment, against the transducer itself. These means 32 are removable and allow replacement of the ultrasonic transducer, which has a limited life span due to its limited resistance to irradiation, risks of damage due to shocks, etc. The supporting means 30 are attached to a piston 33 through an attachment element 34 and are stopped by a pin 35. Piston 33 is displaceable or moveable within a cylinder 36 between a first end position indicated by phantom line 37 in FIG. 3 and a second end position indicated in FIG. 3 by phantom line 38.

The second rotating means 13, adapted to rotate the supporting means 30 of the movable member means around the axis 14 perpendicular to the face to be measured (which is substantially planar), comprises a finger 39 fast with the piston 33 and adapted to cooperate with a slot 40 formed in the cylinder 36 and of which at least a portion is S-shaped. The device comprises in addition actuating means 41 for actuating this piston to displace it from one end position to the other.

Actuating means 41, shown diagrammatically but not illustrated in detail in FIG. 1, comprise, for example, an hydraulic jack 41a, a force limiter device 41b enabling the thrust of this jack to be limited to a given force which does not risk damage to the assembly e.g., a force of 5 DaN, and a shock absorber and return spring 42 connected to the piston 33. The force limiter device 41b may, for example, be a deformable parallelogram provided with a counterweight of 5 daN. Similar force limiting means may also be provided to limit movement in the two directions or axes than the one along which the jack moves to prevent damage to the fuel assembly in the same manner. The hydraulic jack 41a driven, for example, by tap demineralized water, is actuated through a conventional box 41c controlled by the input-output peripheral units 24 of the device, and, as the case may require, connected to the computer 23. Means 13 are designed to create a swing of angle $+\beta$ and $-\beta$ with respect to a position where the lateral transducers 11 are substantially directed along the line 90 perpendicular to the axis 8 of the part to be measured. The value of $\beta$ can advantageously be of the order of 5° to 20°, preferably 10°. The movable member means, or more precisely the supporting means 30, when they are brought up to the grid to be measured are in addition capable of a rotary movement due to first rotating means around an axis parallel to the axis 8 of the grid to be measured. This rotation through an angle $\pm\alpha$ as indicated on FIG. 3 with respect of a central position of the axis 14, may advantageously be between two angular positions of the order of $\pm 15°$. The rotation of the supporting means permit these means to come in abutting contact with the surface of the face to be measured. The rotation is effected with respect to the support 45 of the movable member 5 through pivots 46. The support 45 is fixed to a structure 47 which carries the actuating means 41. Intermediate connectors 48 for transmission cables for transmitting the signals from the transducers 11 and 12 to the data processing units are provided to ensure easy replacement of the transducers.

The structure 47 can be provided at predetermined distances with additional fixed supports 45 and additional supporting means 30. Structure 47 may be attached to the displacement means 6 as in FIG. 1 or be fixed in the pool at a position provided for this purpose.

Figure 8:
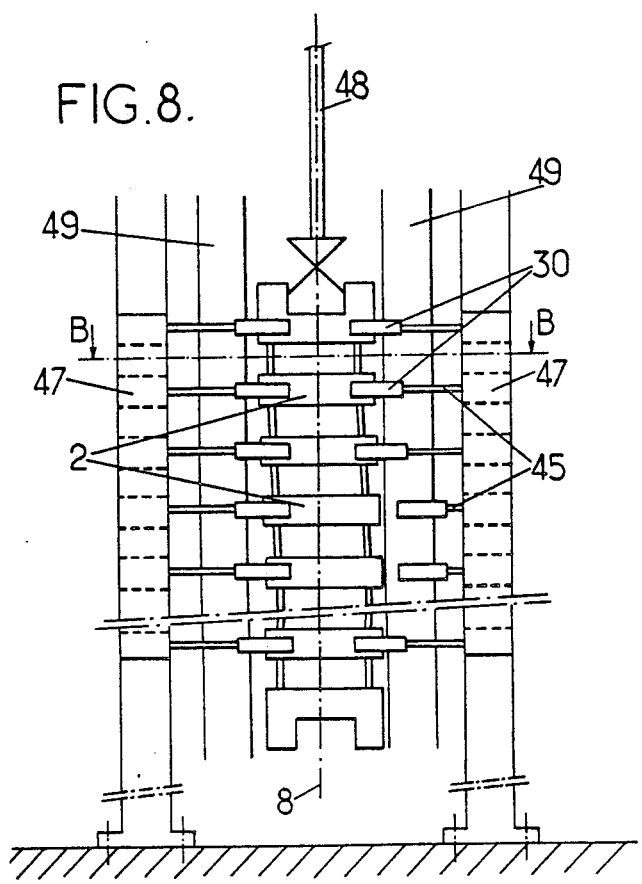
FIG. 8 is a diagrammatic view showing an assembly inside a measuring device according to the invention whose movable member means comprise several supporting means.

FIG. 8 shows, by way of example, a device according to the invention comprising movable member means provided with supporting means 30 whose respective supports 45 are fast with a structure 47 fixed at the bottom of the pool.

Other methods of installation of the structure are possible. It may be hooked to the edge of the pool, held by a handling crane or even simply placed on the bottom of the pool. The supporting means 30 are actuatable simultaneously or individually, the dimensions of the grids of an assembly previously introduced into the device through conventional lifting means 48.

By means of such a device, it is also possible to determine the longitudinal differential deformations of an assembly by adopting a predetermined identical position x, y for all of the supporting means.

The device will have been previously calibrated and the positions of the supporting means 30 fixed, by means of a jig.

Figure 9:
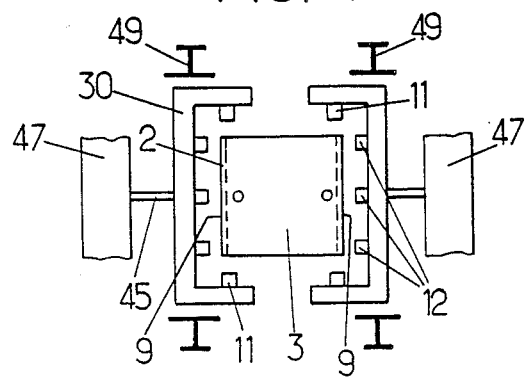
FIG. 9 is a section along line B—B of FIG. 8, slightly enlarged.

External guide means 49 of the supporting means 30 enable a sound operation of the system. FIG. 9 shows a sectional view of the device along line B—B of FIG. 8. Two facing movable member means are shown which permit simultaneous checking of two faces of the same grid. Other types of measuring device comprising differently positioned movable member means may be employed, enabling the number of operations on the same assemblies to be minimized still further, and thus the time diagram of the checking operations to be optimized.

More precisely, FIG. 3 shows supporting means 30 comprising a piece 50 fixed to an element 51 itself rigidly connected to the piston 33. This piece 50 carries three ultrasonic transducers 12 of the type of the transducers 11 whose axes are parallel and whose directions of emission are oriented towards the outer surface of the face of the grid to be measured. Piece 50 comprises two mutually symmetrical end arms 52 each carrying an ultrasonic transmitter-receiver 11 having the same axis and having directions of emission oriented towards one another.

Figure 4:
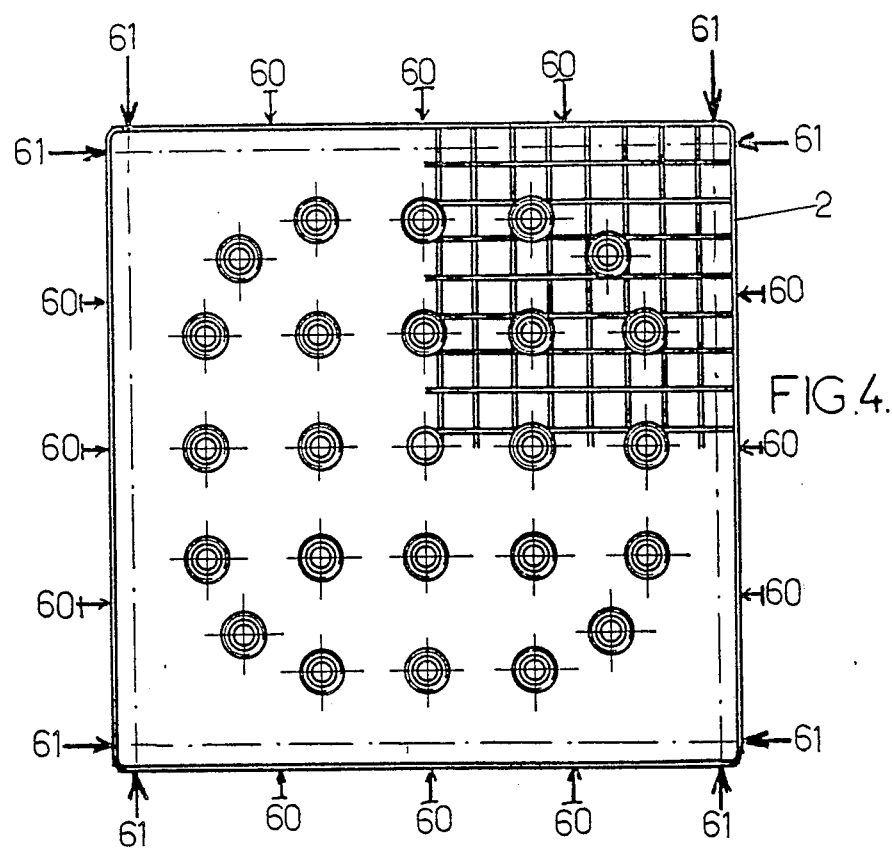
FIG. 4 shows in plan view the points of a nuclear fuel assembly grid where measurements of the length of its faces and of the deformations in planeity could be performed or checked with a device according to the invention.
Figure 5:
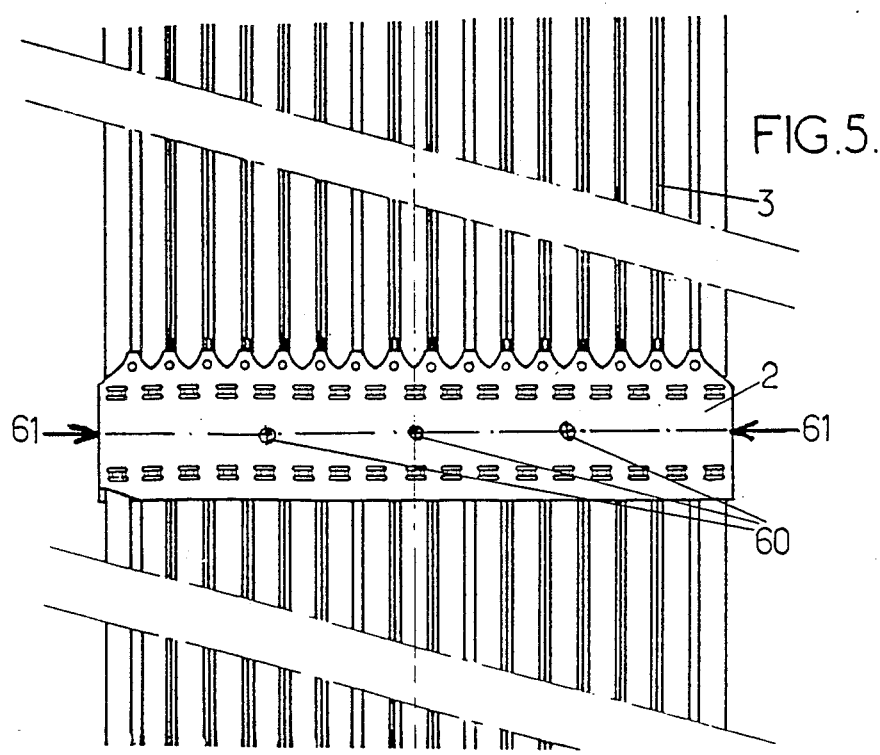
FIG. 5 is a side view of the same grid, showing these checking points.

FIGS. 4 and 5 show diagrammatically, fuel assembly grids which can be checked and measured through a device according to the invention. These are, for example, assemblies for a pressurized water nuclear reactor having fuel elements distributed in cells arranged according to a 17×17 square network.

60 designates the check points advantageously used for verification of the deformations of the external surfaces of the faces of a grid, while 61 designates the check points enabling measurement of the length of the face of a grid, i.e., the width of the grid. It is essentially the intermediate grids, generally formed of zirconium based alloy called "Zicaloy" and susceptible to swelling and significant expansion under irradiation, which are concerned. However, the inventive device is applicable to any type of grid which can be deformed following irradiation or thermal phenomena.

Figure 6A:
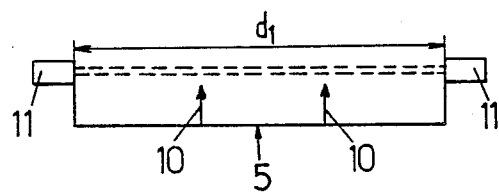
FIG. 6a, 6b, 6c and 6d illustrate the steps followed during the measurement of the length of a grid external lateral face according to the invention.
Figure 6B:
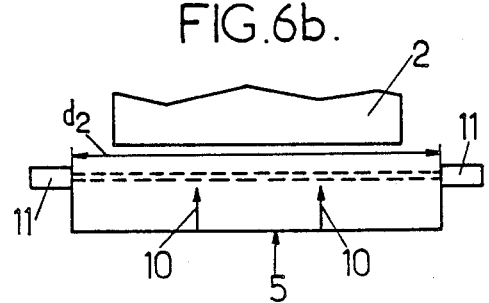

FIGS. 6a, b, c and d illustrate the major steps performed in measuring the length of a lateral face of an assembly grid of a nuclear reactor according to the invention. First, calibration of the device is carried out (FIGS. 6a and 6b) for a known temperature T1. The distance d1 which separates the two ultrasonic transducers 11 of the movable member means 5 (FIG. 6a) is measured while registering the temperature $T_1$. To carry out this measurement, one of the ultrasonic sensors is used as a transmitter and the other as a receiver.

These two transducers have the same axis and their direction of transmission is oriented towards one another. They are spaced from one another by a distance greater than the length of the face of the grid to be measured or checked.

The grid to be checked and the movable member means are then approached up to one another (FIG. 6b) so that the common axis of the two transducers does not encounter the grid of the assembly but so that the temperature of the water at the level of the transducers of the movable member means will be representative of the physical conditions of the contemplated measurement of the grid. The time $t_2$ taken by the ultrasonic wave emitted by one of the two transducers to traverse the new distance $d_2$ (generally different from $d_1$ due to the difference in temperature) between the two ultrasonic transducers is measured and the distance $d_2$ is deduced therefrom by means of a computer program 23. Theoretical temperature $T_2$ of the measurement is determined, $d_1$ at the temperature T1 being known.

Figure 6C:
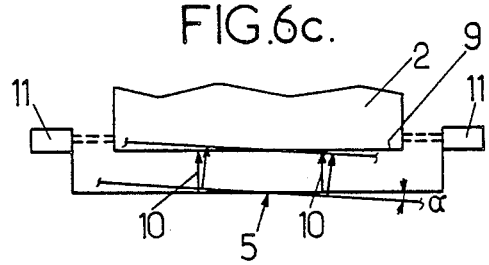

FIG. 6c shows the next step of the measuring method. Movable member means are moved to bring abutting means into contact with the grid 2. The possible pivoting of the movable member means around an axis parallel to the axis of the grid allows adjustment of one with respect to the other. With reference to FIG. 1, the movable member means 5 fixed to the crane belonging to the displacement means 6 is brought into contact with the grid, by means of an automatic or manual device 8 located out of the water and shown in phantom lines.

Figure 6D:
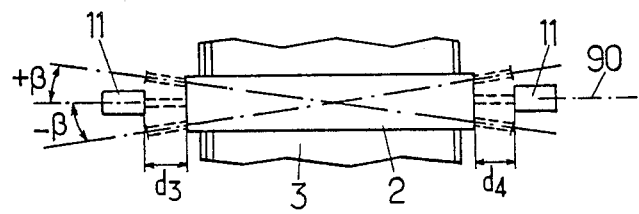

Finally, as shown in FIG. 6d, the movable member means are progressively pivoted from the end angular position $-\beta$ to the end angular position $+\beta$; $\beta$ is, for example, of the order of 10° so as to take into account the actual building features of the grids. The grid measured must in fact not protrude from the angular field of the transmitter-receiver ultrasonic transmissions.

Referring to the device of FIG. 1, shown in more detail in FIGS. 2 and 3, the rotary movement of the supporting means 30 around their horizontal axis is obtained by means of the movement of the finger 38, fast with the piston, in slot 40. The particular shape of the S-shaped slot 40 causes the rotation of the piston and consequently the rotation of the supporting means which are fastened to it.

By continuing to cause the movable member to advance towards the surface to be measured by means of the displacement means 6, the rotation operation is thus carried out very simply.

At the same time, i.e., in the course of rotation, the times of propagation of the ultrasounds between each transmitter-receiver or transducer and the respective surfaces of the grid opposite which reflect these ultrasounds, are measured. The propagation times being proportional to thickness of the layer of water existing between the transmitter and the grid, the overall width of the grid or the length of the face of said grid is deduced therefrom. To this end, the time measurements delivered from each of the two transducers are recorded, and in this way two extremes of propagation times, $t_3$ for one of the transmitter-receivers and $t_4$ for the other, are determined, corresponding to an angular position comprised between $+\beta$ and $-\beta$ and for which the axis of the two ultrasonic sensors or transducers will in fact be perpendicular to the axis of the grid.

The measurement temperature $T_2$ being known (the calculated measure can be corroborated by the value given by thermocouple sensor 16), the distances $d_3$ and $d_4$ between the transducers and the surface of the grid for the "extremes" of propagation times $t_3$ and $t_4$ are deduced. The widths of the grid or length of the faces of the grid are obtained by the formula $$d = d_2 - (d_3 + d_4)$$

To cause the movable member to rotate between two extreme values $-\beta$ and $+\beta$, a predetermined force is communicated to it in a plane transverse to the grid by means of a simple device of the type previously described.

Figure 7A:
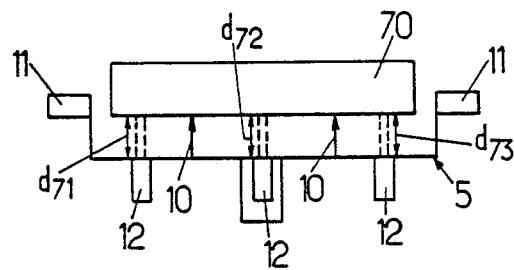
FIGS. 7a, 7b and 7c illustrate the steps followed during measurement of deformation according to the invention.
Figure 7B:
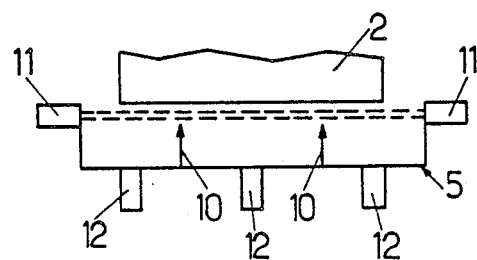
Figure 7C:
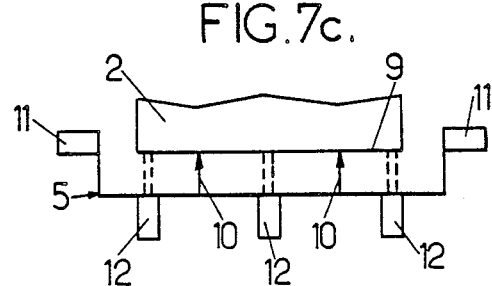

FIGS. 7a, 7b, 7c illustrate the steps to be followed to determine the deformation of the outer surface of a lateral face of an assembly grid.

First of all, the measuring device is calibrated (FIG. 7a and 7b). To this end (FIG. 7a), the measuring member means are placed in contact with a jig 70 and the reference differences $d_{71}$; $d_{72}$, $d_{73}$ which separate each of the sensors and the jig 70 are calculated in a well known manner, from propagation times measured respectively between grids and transducers. Then (FIG. 7b) the temperature of the measurement is determined in the identical manner to that previously described for the determination of the width of the grid.

Finally, (FIG. 7c) the movable member means are moved to bring its abutting means into contact with the grid surface 9 to be measured, then by ultrasound the distances between the movable member and the surface 9 opposite is measured and the values obtained are compared with the values of the reference distances $d_{71}$, $d_{72}$, $d_{73}$.

This enables the relative deformation of the outer surface of the grid to be estimated.

The invention is not limited to those of the embodiments which have been more especially envisaged. Accordingly, all suitable modifications and equivalents may be resorted to, for example the following:

the systematic rotation $\pm\beta$ is obtained by devices other than that described:

the movable member means according to the invention are arranged and disposed for measuring simultaneously at least two of the faces of at least two grids so as to perform simultaneously measurements of at least a significant consequent part of the whole assembly, enabling the whole assembly to be rapidly checked in a limited number of operations, even in only one.

the ultrasonic transducers used to determine the deformations of the grid are more or less numerous than the three specifically mentioned.

We claim:

1. For measuring and checking dimensions of a work-piece having a longitudinal axis and at least one part along said longitudinal axis, said part having a plurality of external lateral faces regularly disposed about said longitudinal axis and defining a polygonal cross-section substantially constant along said longitudinal axis, a measuring device comprising
   (a) measuring means for said part, for measuring the length of said part in a plane orthogonal to the longitudinal axis of one of said external lateral faces of said part;
   (b) movable member means comprising:
      (i) supporting means supporting on end arms thereof a first set of two ultrasonic transducers disposed at a distance from each other larger than the length of said lateral face for measuring the distance between each of said transducers and said part, said transducers being arranged to transmit and receive ultrasound pulses along a same line substantially parallel to said lateral face and in opposite directions, and supporting a second set of three ultrasonic transducers for transmitting pulses of ultrasonic waves having mutually parallel axes substantially orthogonal to the lateral face to be measured, for measuring the length of said part;
      (ii) abutting means carried by said supporting means for abutting contact with said one of said lateral faces;
      (iii) first rotation means for rotating said supporting means about an axis parallel to the longitudinal axis of the work-piece;
      (iv) second rotation means for rotating said supporting means between an initial position where the two transducers are substantially directed along the line perpendicular to the longitudinal axis of the work-piece and two predetermined angular positions symmetrical with respect to said initial position, about an axis perpendicular to said one of said lateral faces and to the longitudinal axis of the work-piece; and
   (c) displacement means connected to said movable means through said first rotating means, for rectilinearly displacing the movable member means for bringing said abutting means into and out of contact with said one of said lateral faces to be measured.

2. The measuring device according to claim 1, for measuring a plurality of additional parts of said work-piece, substantially coaxial to said part and distributed along the longitudinal axis of the work-piece, wherein the movable member means further comprise a plurality of additional supporting means each directed to measure and check an external lateral face of said parts, each of said additional supporting means carrying respective set of two ultrasonic transducers disposed at a distance from each other larger than the length of the corresponding lateral face to be measured, said supporting means being spaced from each other and distributed along an axis parallel to the longitudinal axis of the work piece.

3. The measuring device according to claim 1, wherein the abutting means consist in two abutment stops.

4. For measuring and checking dimensions of a work-piece having a longitudinal axis and at least one part along said longitudinal axis, said part having a plurality of external lateral faces regularly disposed about said longitudinal axis and defining a polygonal cross-section substantially constant along said longitudinal axis, a measuring device comprising
   (a) measuring means for said part, for measuring the length in a plane orthogonal to the longitudinal axis of one of said external lateral faces of said part, said measuring means including a set of two ultrasonic transducers disposed at a distance from each other larger than the length of said lateral face for measuring the distance between each of said transducers and said part, said transducers being arranged to transmit and receive ultrasound pulses along a same line substantially parallel to said lateral face and in opposite directions;
   (b) movable member means comprising:
      (i) supporting means for supporting said two transducers;
      (ii) abutting means carried by said supporting means for abutting contact means with said one of said lateral faces;
      (iii) first rotation means for rotating said supporting means abut an axis parallel to the longitudinal axis of the work-piece;
      (iv) second rotation means, for rotating said supporting means between an initial position where the two transducers are substantially directed along the line perpendicular to the longitudinal axis of the work-piece and two predetermined angular positions symmetrical with respect to said initial position, about an axis perpendicular to said one of said lateral faces and to the longitudinal axis of the work-piece, and (c) displacement means connected to said movable means through said first rotating means, for rectilinearly displacing the movable member means for bringing said abutting means into and out of contact with said one of said lateral faces to be measured;

(d) wherein said supporting means for supporting said transducers comprise a supporting element carrying the transducers, a piston, rigidly connected to said supporting element and movable between a first end position and a second end position, and wherein the second rotation means comprise a finger fast with said piston, a cylinder for slidably receiving said piston, said cylinder being connected to the first rotation means and having an S-shaped slot for receiving the finger of said piston, whereby, when the piston moves within the cylinder from said first end position to said second end position, the supporting element and the transducers rotate along an axis perpendicular to the lateral face to be measured and perpendicular to the longitudinal axis of the work-piece between an initial position where the two transducers are substantially directed along a line perpendicular to the longitudinal axis of the work-piece and two predetermined angular positions symmetrical with respect to said initial position, due to cooperation between the finger and the S-shaped slot during movement of the piston along the cylinder, said measuring device further comprising actuating means for moving the piston from said first end position to said second end position along the cylinder.

5. A measuring device for remotely measuring dimensions of an external lateral face of a nuclear fuel assembly grid, comprising (a) supporting means carrying a set of two ultrasonic transducers aligned along a common direction substantially parallel to said lateral face, facing each other, and mutually spaced by a distance larger than the length of said lateral face, each transducer for measuring the distance thereof with a side of said lateral face; and (b) displacement means connected to said supporting means through connecting means and arranged for rectilinearly moving said supporting means towards said lateral face along a direction orthogonal thereto, until abutment means carried by the supporting means are in abutting contact with said lateral face, said abutment means being arranged for maintaining said common direction parallel to said lateral face when forced into contact with said lateral face;

(c) said connecting means having:
  (i) first rotation means allowing the supporting means to rotate about an axis parallel to a longitudinal axis of the grid parallel to the sides of said lateral face responsive to abutting contact of said abutment means with said lateral face; and
  (ii) second rotation means for forcibly rotating said supporting means about a further axis perpendicular to said lateral face and to the longitudinal axis of the grid throughout a predetermined limited angular range symmetrical with respect to a reference position, where said common direction is substantially perpendicular to the longitudinal axis of the grid, responsive to further movement of said displacement means after said abutment means have initially come into contact with said lateral face.

6. A measuring device according to claim 5, wherein said supporting means further carry an additional set of three ultrasonic transducers having mutually parallel axes located to be substantially orthogonal to said lateral face when said abutment means are in abutting contact with said face, the ultrasonic transducers of said additional set being at mutually different distances from said further axis.

* * * * *